United States Patent
Cheslow

(10) Patent No.: US 7,296,034 B2
(45) Date of Patent: Nov. 13, 2007

(54) INTEGRATED SUPPORT IN AN XML/XQUERY DATABASE FOR WEB-BASED APPLICATIONS

(75) Inventor: Robert D. Cheslow, Los Angeles, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 454 days.

(21) Appl. No.: 10/914,876

(22) Filed: Aug. 10, 2004

(65) Prior Publication Data

US 2006/0036644 A1    Feb. 16, 2006

(51) Int. Cl.
*G06F 17/30* (2006.01)
*G06F 17/00* (2006.01)
(52) U.S. Cl. .................. 707/104.1; 707/3
(58) Field of Classification Search ......... 707/104.1
See application file for complete search history.

(56) References Cited

U.S. PATENT DOCUMENTS

| | | | |
|---|---|---|---|
| 6,654,734 B1 | 11/2003 | Mani et al. ............... 707/2 |
| 6,718,371 B1 | 4/2004 | Lowry et al. ............. 709/213 |
| 6,918,107 B2 | 7/2005 | Lucas et al. |
| 7,171,404 B2 | 1/2007 | Lindblad et al. |
| 2002/0169788 A1 | 11/2002 | Lee et al. ............... 707/104.1 |
| 2004/0060006 A1 | 3/2004 | Lindblad et al. |
| 2004/0078219 A1* | 4/2004 | Kaylor et al. ............. 705/2 |
| 2004/0167915 A1 | 8/2004 | Sundararajan et al. |
| 2004/0267900 A1* | 12/2004 | Hoekstra et al. .......... 709/217 |
| 2005/0021512 A1 | 1/2005 | Koenig |
| 2005/0289125 A1 | 12/2005 | Liu et al. |
| 2006/0036463 A1* | 2/2006 | Patrick et al. ............ 705/1 |

* cited by examiner

*Primary Examiner*—Tim Vo
*Assistant Examiner*—Fariborz Khoshnoodi
(74) *Attorney, Agent, or Firm*—Patrick J. S. Inouye; Krystyna Szul

(57) ABSTRACT

A system for integrated support in an XML/XQuery database residing within a binary object XML repository (BOXR) for web-based applications includes web browser(s) for sending at least one HTTP request for hxl pages. Hxl pages are defined as web pages containing embedded XQuery expressions, with XQuery being an interactive program used to access data. Server module(s) coordinate operations within a control system including an XML/XQuery database. An hxl processor module provides web application support, and a BOXR XQuery engine processes XQuery queries. An XML repository provides stored representation of XML data.

14 Claims, 2 Drawing Sheets

INTEGRATED SUPPORT IN AN XML/XQUERY DATABASE FOR WEB-BASED APPLICATIONS

CROSS REFERENCE TO RELATED APPLICATIONS

The following applications, U.S. patent application Ser. No. 10/914,877, filed Aug. 10, 2004, titled "Extension of XQuery in a High Performance XML/XQuery Database", U.S. patent application Ser. No. 10/914,903, filed Aug. 10, 2004, pending, titled "Full-Text Search Integration in XML Database", and U.S. patent application Ser. No. 10/915,529, filed Aug. 10, 2004, pending, titled "High Performance XML Storage Retrieval System and Method", are assigned to the same assignee of the present application. The entire disclosures of these copending applications are incorporated by reference in their entirety.

INCORPORATION BY REFERENCE

The following U.S. patents are fully incorporated herein by reference: U.S. Pat. No. 6,654,734 ("System and Method for Query Processing and Optimization for XML Repositories"); U.S. Pat. No. 6,718,371 ("XML-Based Integrated Services Framework"); and U.S. Pat. Appl. Pub. No. 2002/0169788 ("System and Method for Automatic Loading of an XML Document Defined by a Document-Type Definition into a Relational Database Including the Generation of a Relational Schema Therefor").

BACKGROUND

This disclosure relates generally to a computer software system and associated method for providing additional functionality for querying and formatting XML, and more particularly to implementation of support for web-based applications within XQuery.

There have been many mechanisms devised for formatting live data within web pages. Most often, a scripting language is used, and this language can in turn invoke queries into a relational database. XQuery is one such scripting language, whose results are formatted as XML. Since XQuery results can be formatted as XHTML, which is directly renderable in many browsers, the language is suitable for implementing Web applications without additional scripting engines. However, web server-side processing requires access to information sent from the web browser, including cookie values and HTTP request parameters. XQuery has no provisions for making external information such as this available within the language.

Extensible Markup Language (XML) is a programming language operating as an extension to HTML and providing enhanced control of content. It may be used to define the content of a document (such as a Web page) rather than the presentation of it or to exchange information and documents between diverse systems. XML is text-based and formats data by using document tags to catalog information. Key elements in a document may be categorized according to meaning, enabling a search engine to scan an entire document for the XML tags that identify individual pieces of text and images rather than selecting a document by the metatags listed in its header.

There are various strategies for storing and managing XML documents. In XML repositories based on relational database technology, the XML is stored using a method known as "shredding". In this approach, the markup is broken up and stored in fields of database tables, and XML queries are translated into a relational query language (e.g. SQL, Structured Query Language) that retrieves the values from the database using relational operations, and generates the markup output. Overhead for storage is high, and performance for regeneration of the XML (or "round-tripping" of entire XML documents) is typically low. Other database managers designed specifically for XML utilize indexing schemes to process the markup representation of XML more efficiently.

Applications for querying XML databases (such as XQuery, a general-purpose XML query language) often require the ability to perform full-text search on the stored data. The search functionality must be integrated within the query language to allow for control over the structures to be searched, and to make search results available to other XQuery constructs. The XQuery specification contains a set of built-in functions that can be called from within query expressions, and also allows for user-defined functions that are written in XQuery.

An example of one approach to querying XML documents is presented in U.S. Pat. No. 6,654,734 to Mani et al. ("System and Method for Query Processing and Optimization for XML Repositories"). The query system of Mani et al. views the data in XML documents as a graph that allows queries on content, structure, inter-document links, and intra-document links. The query language is based on tree pattern match semantics using XML semantics, with features that allow the query system to compute a document type definition for the query language and use it to validate the user query formulation. Query optimization is accomplished using schema-based optimization and index-based optimization. The structure pattern is then converted to a string for storage purposes.

Another approach is described in U.S. Pat. Application Publication No. 2002/0169788 to Lee et al. ("System and Method for Automatic Loading of an XML Document Defined by a Document-Type Definition into a Relational Database Including the Generation of a Relational Schema Therefor"). Under the system of Lee et al., a relational schema is created out of a DTD, and XML data is loaded into the generated relational schema that adheres to the DTD. Starting with a DTD for an XML document containing data, all of the information in the DTD is captured into metadata tables, and then the metadata tables are queried to generate the relational schema. The data contained in the XML document can then be loaded into the generated relational schema.

While the XQuery specification provides certain functionality within built-in functions, and other functionality can be added via user-defined functions written in XQuery, there is currently no functionality within XQuery to support integration of XML data with web applications. It would be desirable to provide a mechanism to return queries in a format that can be rendered directly in web browsers without further processing.

BRIEF SUMMARY

The disclosed embodiments provide examples of improved solutions to the problems noted in the above Background discussion and the art cited therein. There is shown in these examples an improved system for integrated support in an XML/XQuery database residing within a binary object XML repository (BOXR) for web-based applications. The system includes web browser(s) for sending at least one HTTP request for hxl pages. Hxl pages are defined as web pages containing embedded XQuery expressions, with XQuery being an interactive program used to access data. Server module(s) coordinate operations within a control system including an XML/XQuery database. An hxl processor module provides web application support, and a BOXR XQuery engine processes XQuery queries. An XML repository provides stored representation of XML data.

In another embodiment, there is disclosed a method for operating a system for integrated support in an XML/XQuery database residing within a binary object XML repository (BOXR) for web-based applications. The system includes a web browser, a server module, an hxl processor module, a BOXR/XQuery engine module, and an XML repository. The method includes receiving HTTP requests for hxl pages, which are web pages containing embedded XQuery expressions, from the web browser. Operations within a control system having an XML/XQuery database are coordinated. Hxl processor modules provide web applications support and a BOXR XQuery engine evaluates XQuery queries. An XML repository provides stored representation of XML data.

In yet another embodiment, there is provided an article of manufacture in the form of computer usable medium having computer readable program code embodied in the medium. When the program code is executed by the computer, the program code causes the computer to perform method steps for operating a system for integrated support in an XML/XQuery database residing within a binary object XML repository (BOXR) for web-based applications. The system includes a web browser, a server module, an hxl processor module, a BOXR/XQuery engine module, and an XML repository. The method includes receiving HTTP requests for hxl pages, which are web pages containing embedded XQuery expressions, from the web browser. Operations within a control system having an XML/XQuery database are coordinated. Hxl processor modules provide web applications support and a BOXR XQuery engine evaluates XQuery queries. An XML repository provides stored representation of XML data.

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

The system and method described herein provide a layer of support for Web applications within a Binary Object XML Repository (BOXR), as described more fully in U.S. patent application Ser. No. 10/915,529, filed Aug. 10, 2004, pending, titled "High Performance XML Storage Retrieval System and Method", the disclosure of which are incorporated by reference, to facilitate the construction of applications written in XQuery. Values of Cookies and HTTP parameters are bound to XQuery variables with global scope. A mechanism in this layer allows XQuery to be embedded within static HTML pages, evaluating the XQuery and replacing the query expressions with XHTML results that can be rendered directly by the browser.

XQuery, a language specification from the W3C standards committee allows querying of XML documents. XQuery also specifies functions which process or filter XML data. A set of built-in functions are specified as part of the language, and other functions can be defined by the query-writer as part of a query.

In the following description numerous specific details are set forth in order to provide a thorough understanding of the system and method. It would be apparent, however, to one skilled in the art to practice the system and method without such specific details. In other instances, specific implementation details have not been shown in detail in order not to unnecessarily obscure the present invention.

Various computing environments may incorporate capabilities for providing integrated support for web-based applications in an XML/XQuery database. The following discussion is intended to provide a brief, general description of suitable computing environments in which the method and system may be implemented. Although not required, the method and system will be described in the general context of computer-executable instructions, such as program modules, being executed by a single computer. Generally, program modules include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like.

The method and system may also be practiced in distributed computing environments where tasks are performed by remote processing devices that are linked through a communications network. In a distributed computing environment, program modules may be located in both local and remote memory storage devices.

Figure 1:
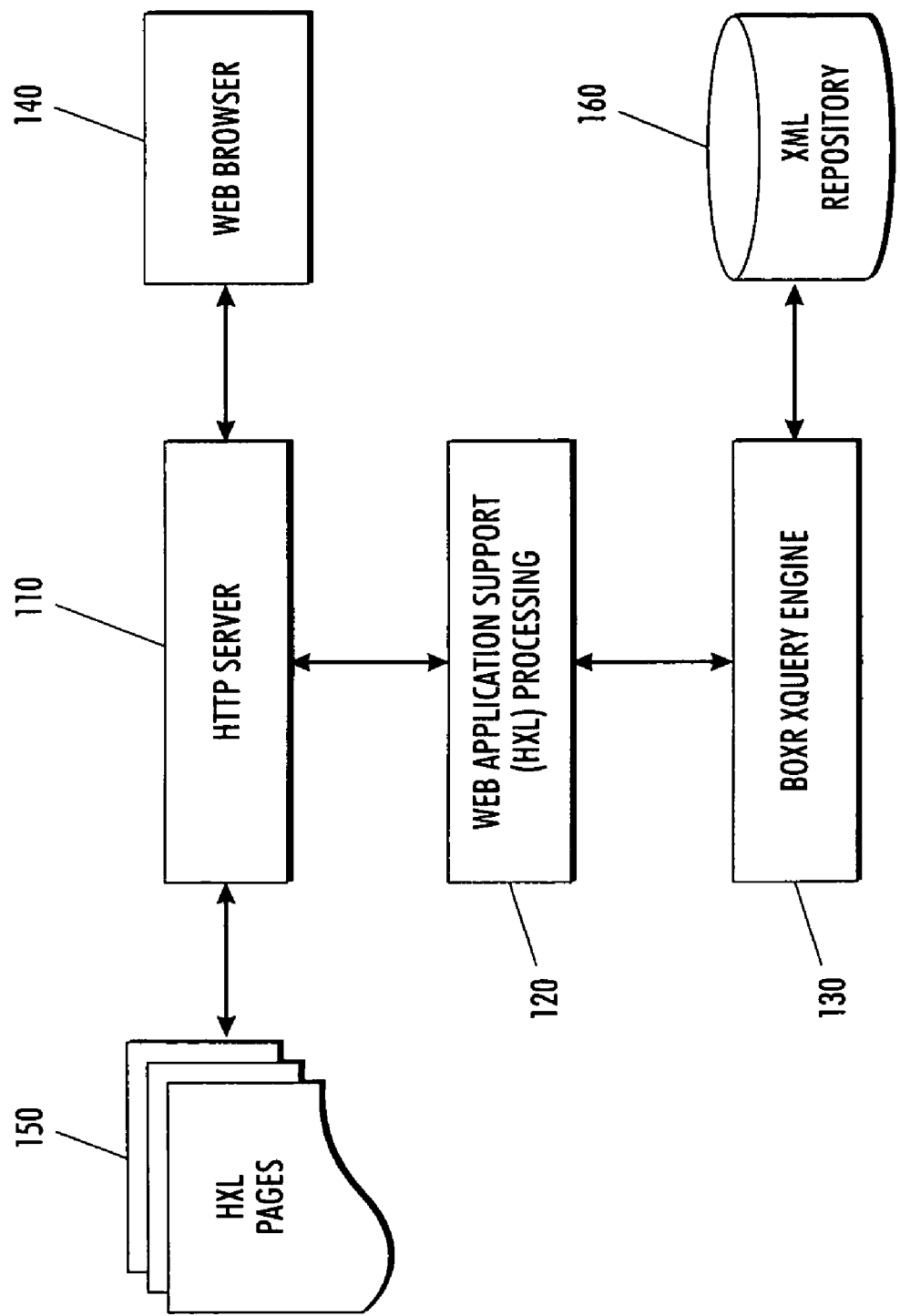
FIG. 1 is a schematic diagram of an example embodiment of the system for integrated support in an XML/XQuery database for web-based applications.

Referring to FIG. 1, the system for integrated support in an XML/XQuery database for web-based applications is illustrated. As will be appreciated, the BOXR Application Program Interface (API) implements mechanisms that make it easier to combine HyperText Markup Language (HTML) and XQuery. While an entire web page can be constructed simply by executing an XQuery that returns XHTML, it is often easier to create a static HTML page that incorporates only sections of XHTML that displays live data. It is noted that XHTML is very similar to HTML, except that it adheres to XML formatting rules BOXR supports this by processing HTML pages that contain directives for evaluating embedded XQuery queries and inserting the (XHTML) results at specified locations within the page. HXL pages 150 include HTML (HyperText Markup Language) pages containing embedded XQuery code. By the BOXR convention, web pages that contain embedded XQuery expressions are called ".hxl" pages (a file naming convention to identify pages that are formatted for BOXR processing); this file extension notifies the web server that the page is to be processed by BOXR. In a web application, the user opens a web browser 140 such as Internet Explorer and enters a URL, which is sent from browser 140 to server 110 in the form of an HTTP (HyperText Transport Protocol) request. In BOXR applications, the URL requests a file with an ".hxl" file extension. The server 110 is configured to recognize this and rather than return the contents of the file directly, passes on the request to BOXR, which resides within server 110. BOXR then processes the hxl file and returns the results of the processing to server 110. The result of the processing is a well-formed HTML/XHTML web page. The server 110 in turn sends this page back to web browser 140, where it is displayed. HTTP server 110 Server 110 passes the HTTP request to the BOXR HXL processor 120. In order to process requests from thin clients, those browsers with no additional programs (i.e. no other client-side processing is required, only a standard web browser), the server processing code must have access to information sent to the HTTP server. This information is sent in the HTTP header, or in the data sent within HTTP "GET" or "POST" requests, and includes the values of "cookies" stored on the client and values of input fields contained in browser forms.

HXL processor 120 retrieves the values of cookies and HTTP parameters, binds these values to XQUERY global variables, and identifies the embedded XQUERY in the HXL pages. HXL processor 120 then sends these XQuery queries to BOXR query engine 130. In order to enable this approach in real-world applications, some simple mechanisms have been added to the BOXR API to support integration of XML data with web applications. BOXR makes this information accessible from anywhere within an XQuery query by creating an XQuery variable binding for each value. Since the XQuery specification provides for lexically scoped variables (using the '$' prefix), but not global variables, BOXR adds the ability to bind variables with global scope. These variables are referred to by a name preceded by the '$$' prefix to distinguish them from lexically scoped variables. For example, if a cookie is stored on the client with the name of "userid", the current value of this cookie can be accessed within XQuery by referring to "$$userid". BOXR/XQuery engine module 130 is the BOXR XQuery interpreter—it receives XQuery queries, evaluates them according to the XQuery specification, and returns the results. The XML repository 160 provides BOXR's stored representation of the XML data. BOXR query engine 130 returns the results of the XQuery evaluation back to HXL processor 120, which inserts these results in the specified locations in the HXL pages. The resulting web page is returned to the web server 110, which then sends the page back to the web browser.

The support for these mechanisms is implemented in BOXR's built-in HTTP server. In addition, for applications using other web servers, the support mechanisms are implemented in an ISAPI (Internet Server API) module that can be linked with most commercial web servers.

Figure 2:
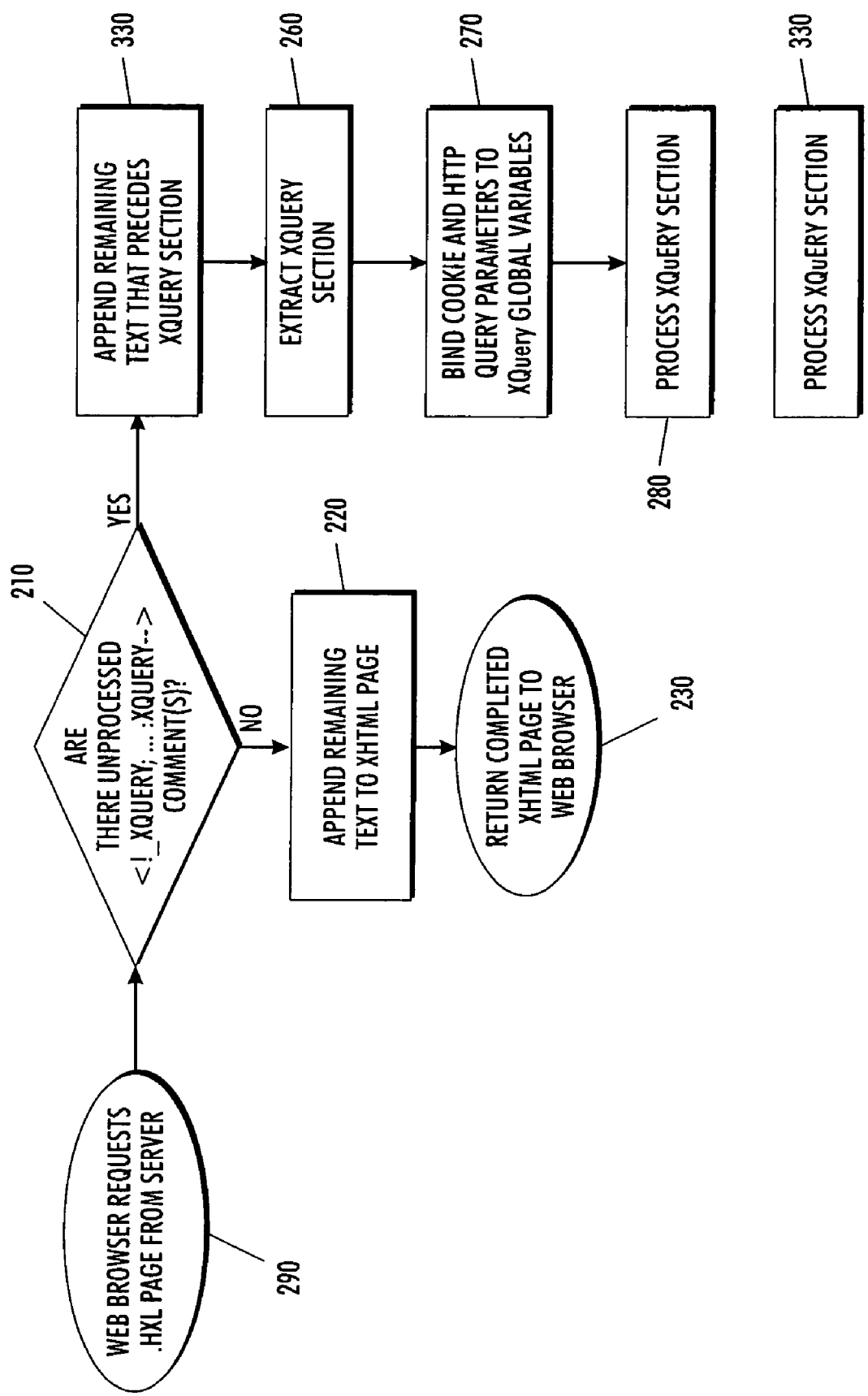
FIG. 2 is a flowchart demonstrating one embodiment of the method for integrated support in an XML/XQuery database for web-based applications.

Turning now to FIG. 2, at 290 the web browser requests an HXL page from the server. A determination is made at 210 as to whether there are unprocessed <!--XQUERY: . . . :XQUERY--> comments.

When the HXL page is requested from the browser, the browser invokes the BOXR hxl processor, which reads the page. The HXL processor extracts the portion of the page within the XQUERY comment and sends this to the XQuery interpreter for evaluation. If there are no unprocessed comments, at 220 the remaining text is appended to the XHTML page and at 230 the completed XHTML page is returned to the web browser. If there are unprocessed comments, at 240 the remaining text that precedes the XQUERY section is appended to the end of web page that is returned to the browser. At 250 the XQuery section is extracted, discarded, and replaced by the results of the query evaluation. The system binds the cookie (text files managed by the web browser to store information associated with particular web sites) and HTTP query parameters to XQuery global variables at 260. Since the HXL processor retrieves the values for the HTTP parameters and cookies and makes these values available to the XQuery interpreter, BOXR can provide these values in the query results. All variables in XQuery start with a "$" sign (per the XQuery specification). BOXR adds the ability to use global variables which are accessible anywhere within an XQuery query; these variables start with "$$". The XQuery section is processed at 270. The query results are appended to the XHTML page at 280 and the results are returned to 210 for further evaluation.

While the present discussion has been illustrated and described with reference to specific embodiments, further modification and improvements will occur to those skilled in the art. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this disclosure is not limited to the particular forms illustrated and that it is intended in the appended claims to embrace all alternatives, modifications, and variations which do not depart from the spirit and scope of the embodiments described herein.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed:

1. A system for providing integrated support in an XML/XQuery database for Web-based applications, comprising:
   a Web browser to send an HTTP request for Web pages containing embedded XQuery expressions;
   a Binary Object XML Repository to recognize the Web pages that contain embedded XQuery expressions; and
   an hxl processor to process each XQuery expression in each of the Web pages, comprising:
      an extraction module to extract the XQuery expression from the Web page;
      an evaluation module to evaluate the XQuery expression as a query on an XML/XQuery database; and
      a results module to provide results from the query in the Web page in place of the XQuery expression,
   wherein the Web page with the results from the XQuery expressions is returned to the Web browser.

2. A system according to claim 1, wherein the XQuery expressions are discarded from the Web page.

3. A system for integrated support in an XML/XQuery database for web-based applications according to claim 1, wherein information is associated with particular Websites by cookies and HTTP parameters that are managed with the Web browser; and the values of the cookies and the HTTP parameters are retrieved.

4. A system according to claim 3, wherein the values of the cookies and the HTTP parameters are bound to global XQuery variables.

5. A system according to claim 1, wherein remaining text preceding the XQuery expressions is appended to the end of a the Web page.

6. A system according to claim 1, wherein
the values of the cookies and the HTTP parameters are provided as part of the results from the XQuery expressions.

7. A system according to claim 1, wherein each portion of the Web page that occurs between a pair of XQuery comments is identified; and the XQuery expressions are extracted from each of the portions.

8. A method for providing integrated support in an XML/XQuery database for Web-based applications, comprising:
receiving an HTTP request for Web pages from a Web browser;
recognizing the Web pages that contain embedded XQuery expressions;
processing each XQuery expression in each of the Web pages, comprising:
extracting the XQuery expression from the Web page;
evaluating the XQuery expression as a query on an XML/XQuery database; and
providing results from the query in the Web page in place of the XQuery expression; and
returning the Web page with the results from the XQuery expressions to the Web browser.

9. A method according to claim 8, further comprising:
discarding the XQuery expressions from the Web page.

10. A method according to claim 8, further comprising:
appending remaining text preceding the XQuery expressions to the end of the Web page.

11. A method according to claim 8, further comprising:
storing information associated with particular Websites by managing cookies and HTTP parameters with the Web browser; and
retrieving the values of the cookies and HTTP parameters.

12. A method according to claim 11, further comprising:
binding the values of the cookies and the HTTP parameters to global XQuery variables.

13. A method according to claim 8, further comprising:
providing the values of the cookies and the HTTP parameters as part of the results from the XQuery expressions.

14. A method according to claim 8, further comprising:
identifying each portion of the Web page that occurs between a pair of XQuery comments; and
extracting the XQuery expressions from each of the portions.

* * * * *